Dec. 28, 1948.　　　　E. A. HOBART ET AL　　　　2,457,372
ALTERNATING CURRENT VERTICAL WELDER
Filed Feb. 11, 1947　　　　　　　　　　　　　　3 Sheets-Sheet 1

INVENTORS
EDWARD A. HOBART &
RUSSELL T. FLORA
BY
Toulmin & Toulmin
ATTORNEYS

Dec. 28, 1948.  E. A. HOBART ET AL  2,457,372
ALTERNATING CURRENT VERTICAL WELDER
Filed Feb. 11, 1947  3 Sheets—Sheet 2

INVENTORS
EDWARD A. HOBART &
RUSSELL T. FLORA
BY
Toulmin & Toulmin
ATTORNEYS

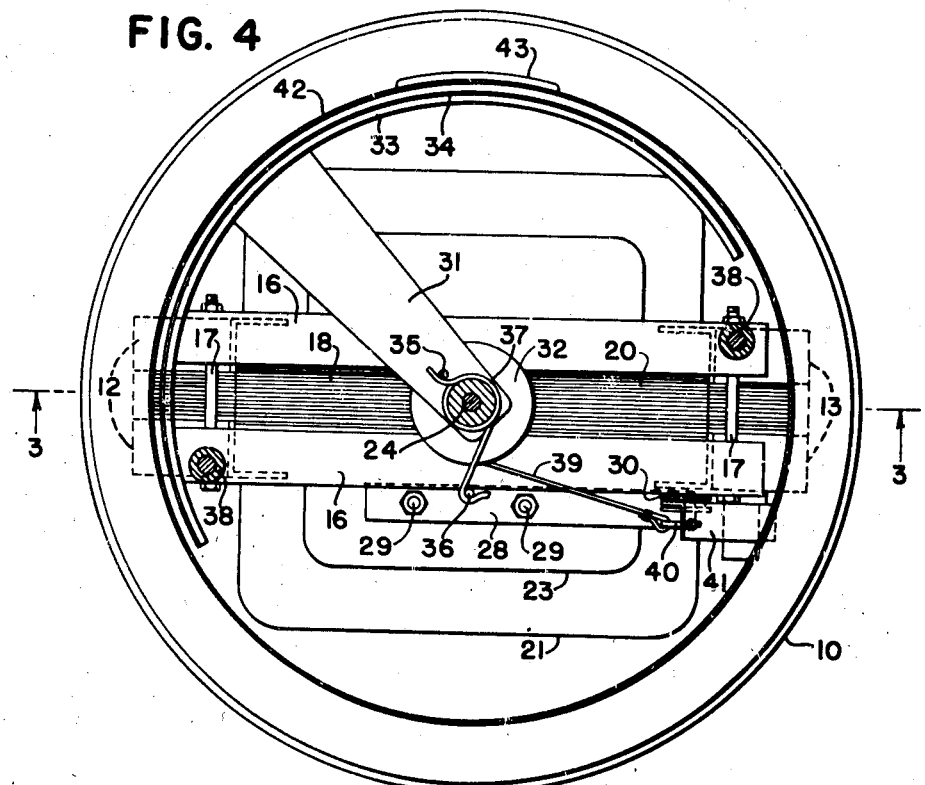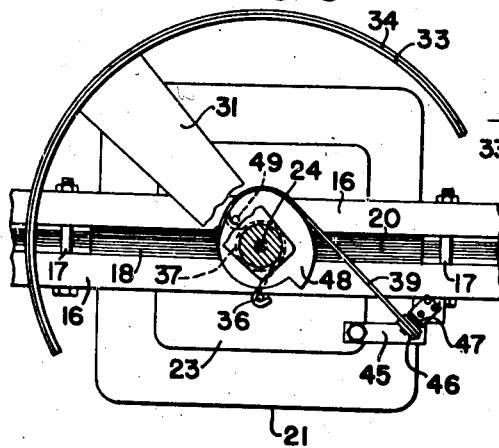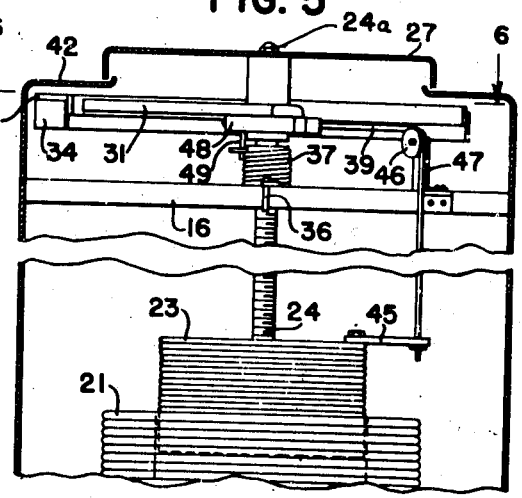

Patented Dec. 28, 1948

2,457,372

UNITED STATES PATENT OFFICE 2,457,372

ALTERNATING CURRENT VERTICAL WELDER

Edward A. Hobart and Russell T. Flora, Troy, Ohio, assignors to The Hobart Brothers Company, Troy, Ohio, a corporation of Ohio Application February 11, 1947, Serial No. 727,830

3 Claims. (Cl. 171—119)

1

This invention pertains to improvements in controls for welding transformers.

More particularly, this invention pertains to a method of adapting a uniformly scaled dial, for indicating the number of amperes being produced in a welding apparatus, to a welding transformer in which the rate that the amperes are given off is not uniform but one that varies according to the position of the transformer coils.

In welding transformers, the amperage varies according to the proximity of the primary and secondary coils. When these coils are in their closest relationship, the output of amperes is highest. As the primary coil is moved away from the secondary coil, the quantity of amperes produced decreases at a rapid rate at first, but at a slower rate as the coils are moved farther apart. This change in rate of amperes produced would ordinarily require that the dial used in connection with the welding transformer to indicate the amperes being produced at any given time would necessarily have to be one incorporating a graduated scale in order to compensate for this changing rate.

Accordingly, an object of this invention is to incorporate, in connection with a welding transformer, a dial capable of using a standard, uniformly graduated scale to indicate the number of amperes being produced in the welding apparatus.

Another object of this invention is to decrease the possibility of mistakes occurring in welding operations caused by incorrect dial readings, by making possible the use of an easily read, uniformly scaled dial instead of the more difficultly read, variably scaled dial.

Further features and advantages of this invention will appear from a detailed description of the drawings in which:

Figure 4 is a top view of the welding transformer shown by the line 4—4 of Figure 3.

Figure 5 is a side sectional and descriptive view of a welding transformer incorporating an alternative arrangement of this invention.

Figure 6 is a top view of the welding transformer and alternative arrangement shown by the line 6—6 of Figure 5.

2

Figure 3:
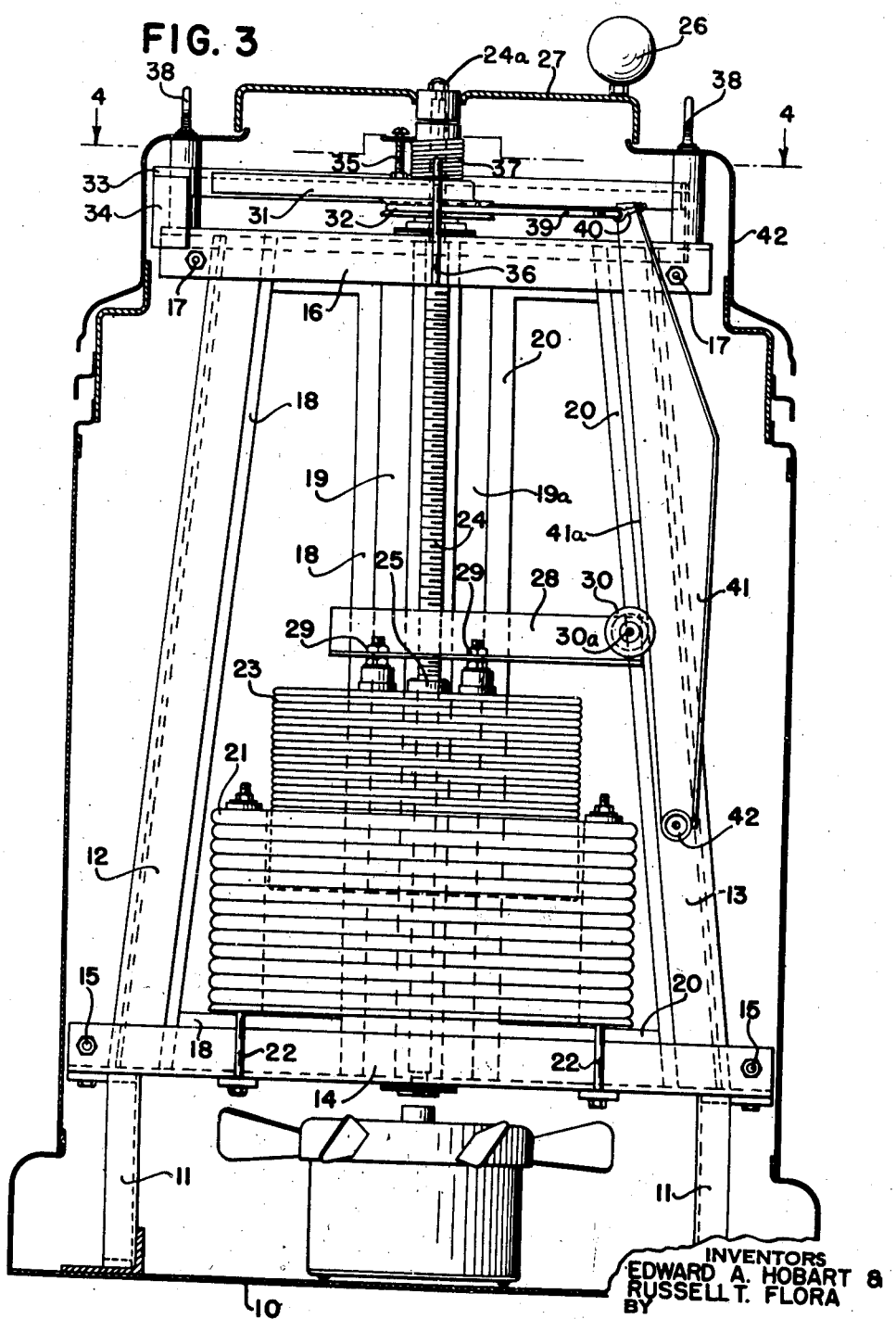
Figure 3 is a sectional and descriptive view shown by the line 3—3 of Figures 1 and 4.

Referring particularly to Figure 3, the welding transformer incorporating the features of this invention is best shown. The apparatus comprises a base 10 to which are attached frame supports 11. From each frame support 11, extending upwards in a slanting direction, is a pair of angle irons or frame members 12 and 13. The base of the front angle iron of the pair of angle irons 12 is connected by a cross member 14 to the base of the front angle iron of the pair 13. The bases of the rear angle iron of each pair of angle irons 12 and 13 are similarly connected. The cross members 14 are securely bolted at 15. The tops of the pairs of frame members 12 and 13 are similarly connected by cross members 16, Figure 4. The cross members 16 are held together by the bolts 17.

A core 18, referring again to Figure 3, is positioned between the pair of angle irons 12, the cross members 16 (note Figure 4), a strip 19, and the cross members 14. A core 20 is similarly positioned between the pair of angle irons 13, the cross members 16 (note Figure 4), a strip 19a, and the cross members 14. The secondary coil 21 is suitably fixed on the cross members 14 by the clamping bolts 22. The primary coil 23 is guided for vertical movement on the strips 19 and 19a of the core members 18 and 20. This movement is effected by a screw 24 and nut 25 fixed to the coil 23. The cores 18 and 20 both pass through the transformer coils 21 and 23. The primary coil 23 may be moved up or down on the screw 24 by movement of the knob 26 fixed to the cap 27, which cap is suitably fastened by a nut 24a to the screw 24.

An angle iron functioning as an arm 28 is fixed to the primary coil 23 by the bolt and nut arrangement 29. A roller 30 is journaled on a pin 30a carried in the arm 28. An arm 31 fixed to a pulley 32 is placed on the cross members 16, Figure 4, so that the screw 24 passes through the center of the pulley 32 in such a manner that the movements of the screw 24 and of the pulley 32 are independent of each other. To the end of the arm 31 is attached a semi-circular metal band 33. To this band 33 is secured a card 34 on which is printed a uniformly graduated scale. A bolt 35 is fixed to the arm 31. A rod 36 is fastened to one of the cross members 16. A torsion coil spring 37 is placed around the screw 24 but independent of it. One end of the spring 37 is hooked around the fixed rod 36 and the other end of the spring 37 is placed against the bolt 35, fixed on the arm 31, so that the spring 37 tends to normally turn the arm 31 in a clockwise direction, Figure 4. Also fixed to the cross members 16 are eyelets 38 by which the whole welding apparatus may be lifted.

A cable 39, referring again to Figure 3, is fixed to the pulley 32 and wrapped around it, while the other end of the cable 39 is attached by hook arrangement 40 to the lever 41. Lever 41 is pivoted to the front member of the pair of frame members 13 by the pin means 42. The roller 30 of the arm 28 contacts the lever surface 41a.

Figure 1:
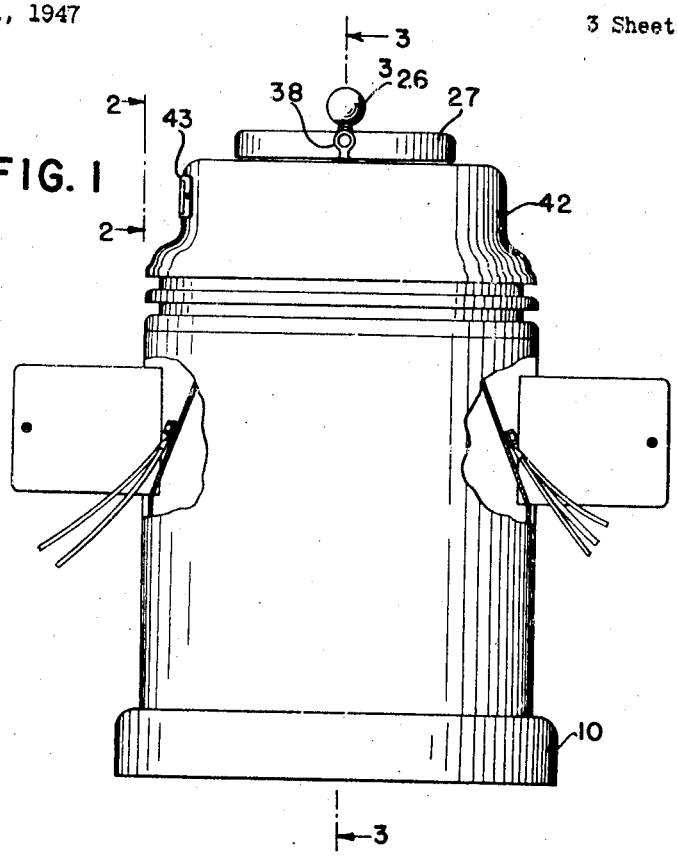
Figure 1 is a side view of a welding transformer incorporating the features of this invention.
Figure 2:
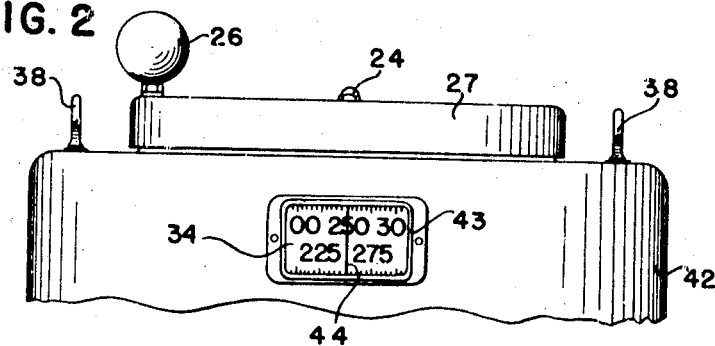
Figure 2 is a front view of the upper portion of the welding transformer shown by the line 2—2 of Figure 1.

A cover 42, Figure 2, is placed around the apparatus. In the cover 42 is a window 43 having a fixed indicator line 44 through its center. Through the window 43 may be seen the card 34 on which the uniform scale is printed.

In operation, referring again to Figure 3, rotating the cap 27 by the knob 26 turns the screw 24 so that the primary coil 23 is either raised or lowered as desired. When the primary coil 23 moves upward, the arm 28 with attached roller 30 acts against the surface 41a of the pivoted lever 41. This swinging movement of the lever 41 exerts a pull on the cable 39 which actuates the pulley 32 so as to turn the arm 31 and uniformly scaled card 34 in a counterclockwise direction, opposed to the coil spring 37. When the primary coil 23 is in closest relationship to the secondary coil 21, the output of amperes is greatest. As the primary coil 23 moves up on the screw 24 away from the secondary coil 21, the quantity of amperes produced falls off at a rate which is initially great but which rate of fall-off diminishes as the coils become farther apart. A short movement of the primary coil 23 when it is close to the secondary coil 21 will result in the pulley 32 (and arm 31 and card 34) being turned through a greater distance than will the same amount of movement of the primary coil 23 when it is farther from the secondary coil 21.

Thus equal movements of the primary coil 23 will cause varying movements of the card 34, depending on the distance relationship between the primary coil 23 and secondary coil 21.

Thus, when the primary and secondary coils are close together, a small movement of the primary coil 23 away from the secondary coil 21 will result not only in a large drop in the rate of amperes being produced, but also in a large movement of the card 34 to compensate for this. Similarly, when the coils are further apart, a small movement, equal to that mentioned above, of the primary coil 23 away from the secondary coil 21 will result in only a small drop in the rate of amperes produced but, compensating for this, it will also result in only a small movement of the card 34. Thus, a uniformly graduated scale may be used on the card 34 to indicate the varying quantity of amperes being produced in the welding transformer since these variations in their rate of production are automatically taken care of by the above described mechanism.

In the alternative arrangement, Figures 5 and 6, the lever arrangement above has been replaced by the use of a cam or eccentrically-shaped pulley. The welding transformer itself is constructed similarly to that just described.

To the primary coil 23 is fixed an arm 45. A cable 39 is fastened to the end of this arm 45. The cable 39 passes over an idler pulley 46 which is fixed to an arm 47 fixed on the cross member 16. The cable 39 is attached to and wrapped around a cam or eccentrically-shaped pulley 48 secured to the arm 31. A torsion coil spring 37 placed around the screw 24 and resting on the cross members 16 has its ends secured to the rod 36, fixed to the cross members 16, and the rod 49, attached to the cam or eccentrically-shaped pulley 48. The pulls exerted on the cam 48 and arm 31 by the spring 37 and cable 39 are in opposition to one another.

The necessary variations in the distance that the card 34 must move in order to indicate the amperes being produced by the welding apparatus are caused by this cam arrangement. As the primary coil 23 is moved away from the secondary coil 21, the cam or eccentrically-shaped pulley moves at first through great distances and then, as the coils become farther apart, through shorter distances. Thus, this arrangement also provides a method for using a uniformly scaled card to indicate the amperes produced in a welding apparatus in which the rate of amperes given off is not uniform but one which varies, depending on the distance relationship of the transformer coils. Again this changing rate is compensated for by the mechanism, in this case the cam arrangement, rather than by varying the graduations of the scale used on the dial card.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a welding transformer having a pair of relatively movable transformer coils, adjusting means for relatively moving said coils, a uniformly graduated indicator dial showing the output of said transformer, means for actuating said dial to variably spaced positions during the relative movement between said coils to regularly spaced positions comprising a lever means, and means for regulating said last mentioned lever means so that said dial is moved at rates which vary according to the relative positions of said coils comprising a contacting device moved by said adjusting means engaging said lever and moved longitudinally thereof upon relative movement of said coils.

2. In a welding transformer having a pair of relatively movable transformer coils, a uniformly graduated indicator dial showing the output of said transformer, means for moving said coils relative to one another so as to vary the output of said transformer, and a lever and pulley arrangement for variably positioning said indicator dial during the regular relative positioning of said coils so as to indicate the output of said transformer for all positions of said coils including means for pivotally supporting one end of said lever, a cable interconnected between the other end of said lever and said pulley, a lever actuating contact, member movable longitudinally of said lever radially of the axis of said pivotal support, and means for longitudinally moving said contact during the movement of said coils.

3. In a welding transformer, a frame, a pair of relatively movable transformer coils supported in said frame, and adjusting mechanism for affecting said relative movement, a uniformly graduated indicator dial showing the output of said transformer, an arm attached to said dial and fixed to a pulley journaled in said frame, a swinging lever pivoted on said frame at one end and hooked to said pulley by a cable attached to its other end, means including a lever contacting device movable longitudinally of said lever between said pivot and said cable attachment points, and a support for said contacting device moved by said adjusting mechanism for actuating said swinging lever during the relative movement of said coils so as to move said dial to predetermined variable positions for uniform relative positions of said coils.

EDWARD A. HOBART.
    RUSSELL T. FLORA.

REFERENCES CITED

The following references are of record in the file of this patent:

UNITED STATES PATENTS

| Number | Name | Date |
| --- | --- | --- |
| 516,847 | Thomson | Mar. 20, 1894 |
| 497,180 | Gates | Jan. 11, 1898 |
| 2,438,202 | Burns | Mar. 23, 1948 |